United States Patent Office 2,963,398
Patented Dec. 6, 1960

2,963,398

SYNERGISTIC INSECTICIDAL COMPOSITIONS

Howard A. Jones and John A. Garman, Baltimore, Md., and Berton C. Dickinson, Lydonville, N.Y., assignors to Food Machinery and Chemical Corporation, New York, N.Y., a corporation of Delaware No Drawing. Original application Mar. 24, 1955, Ser. No. 496,596. This application Nov. 5, 1958, Ser. No. 771,948

2 Claims. (Cl. 167—22)

This invention relates broadly to insecticidal compositions, and more particularly to insecticidal compositions containing an organic carbamate acid derivative and O,O-dimethyl-S-(1,2-dicarbethoxyethyl) dithiophosphate, hereinafter referred to as Malathion. More particularly, this invention relates to synergistic insecticidal compositions of these compounds wherein the insecticidal effectiveness of each component is enhanced by the presence of the other to produce an unexpected combined effect.

When two or more substantces in combination show an unexpectedly high activity, as for instance, insecticidal activity, the resulting phenomenon is called synergism. The mechanism of synergism is by no means understood. It is, in fact, quite probable that it differs with different synergistic combinations. The term "synergism" can be defined, however, as a cooperative action which is encountered in combinations of two or more biologically active components in which the combined activity of the two components exceeds the sum of the activities of the components when used alone. The insecticidal activity of the mixed components cannot be predicted from known values of the individual components, but is unpredictable and depends on the individual activity of neither.

It is an object of this invention to provide insecticidal compositions of enhanced killing power. Another object of this invention is to produce novel compositions containing compounds capable of synergizing the knockdown and killing properties of individual toxicants. A further object of this invention is to provide compositions including a relatively toxic phosphorus containing insecticide in which superior insecticidal activity is obtained because of the synergistic effects, but in which the ultimate toxicity to warm blooded animals is greatly reduced because of the lower concentrations of the phosphorous compounds required when used in combination with the relatively less toxic carbamates. Other objects and advantages of the invention will become apparent from the description of the invention set forth below.

According to this invention there are provided synergistic insecticidal compositions comprising O,O-dimethyl S-(1,2-dicarbethoxyethyl) dithiophosphate, hereinafter called Malathion, and an organic carbamate ester of the following general formula

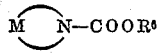

wherein M is selected from the group consisting of ethyleneoxyethylene, tetramethylene and pentamethylene and $R^6$ is phenyl. These carbamates may be prepared as described in copending application Ser. No. 812,113, filed May 11, 1959.

The synergistic insecticidal compositions of this invention may be used on a wide variety of insect and mite species, but are particularly effective against such insects as the two-spotted spider mite and the squash bug. The combinations are highly effective and economical to use for such large-scale insecticidal requirements as the control of truck crop, forage crop and orchard insects.

The synergistic compositions of this invention can be formulated as aqueous emulsions, as dry or wettable powders, as solutions or in any other suitable vehicle. The insecticidal compositions can be utilized as sprays, as dusts, as aerosol mixtures, insecticidal coating compositions, and as residues. In general, they can be applied by methods commonly used for control of eradication of insects, mites and the like. Thus these insecticidal compositions can be formulated with solvents, diluents and carrier media, adhesives, spreading, wetting and emulsifying agents and other ingredients.

The relative proportions of the active ingredients as well as inert carriers, solvents, dispersants and the like may vary within wide limits.

Thus the relative proportion (ratio) of the Malathion to the carbamate ester can range from 20 parts of the former per 1 part of the latter to 1 part of the former per 40 parts of the latter and preferably about 1 part of the former to about 2 parts of the latter.

The quantities of the components toxicants in the final insecticidal compositions can range from 0.01% to 25.00% for the Malathion and from 0.05% to 50.00% for the carbamate, and preferably from 0.10% to 10.00% for the Malathion and from 0.10% to 25.00% for the carbamate.

The procedures of the testing methods are described below. The details of the test experiments including the type of formulation and mode of application or dosing, and the species of insects which served as test subjects are given in the examples.

Insects used in the testing including the house fly (*Musca domestica* L.), Mexican bean beetle (*Epilachna varivestis* Muls., pea aphid (*Macrosiphum pisi*. [Kltb.], two-spotted spider mite (*Tetranychus bimaculatus* Harvey), harlequin bug (*Murgantia histrionica* [Hahn]) and squash bug (*Arnasa tristis*).

The test methods used are described as follows:

DUST TOWER METHOD

This general method is described in the following reference, Moore, J. Econ. Ent., 43, No. 2, 188–190 (1950).

The dusting apparatus consists of a vertical glass cylinder, 34 inches high and 8.5 inches in diameter, into which the appropriate dust sample is discharged through a small hole in the center of the cover, by means of a small laboratory duster operating at an air pressure of 40 p.s.i.g. The "duster assembly" comprises a 10 ml. beaker, into which the weighed sample is placed, and fitted with a rubber stopper through which pass the air inlet and dust outlet tubes, both of which are made of ¼ inch diameter copper tubing. At the outer end of the air inlet tube is a trigger valve that serves as a control for dispensing the dust. The inner end of this tube reaches nearly to the bottom of the beaker. The end of it is sealed but, along the sides, seven 0.032 inch holes are drilled at irregular intervals which serve as air inlets. Such an arrangement causes pronounced turbulence of the dust and thus insures exhausting the complete sample from the beaker. The dust outlet tube forms an arch from the top of the beaker to the top of the glass dusting tower.

After discharge of the sample into the tower, there is allowed a 2-minute settling time before removal of foliage or insects being treated. A weighed metal plate is placed in the tower each time a test is made, and by weighing the amount of dust deposited on it, it is then possible to calculate the amount applied per acre.

Because of day-to-day variations in the results obtained by this test method, comparisons among the individual components and their combinations were made simultaneously in order to minimize this source or variation.

Slight modifications in this test employed for specific insect species are as noted below.

*Two-spotted spider mite.*—In tests on two-spotted mites, the mites were confined to the upper surfaces of potted bean plants by a "Tanglefoot" ring. The bean plants were placed in the glass tower and the mites "direct-dusted." Mortality readings were taken in 24 hours. Only adult mites were used in determining mortality counts.

*Squash bug.*—For this test squash leaves were collected in the field and the cut ends were unwrapped in moist cotton. Individual leaves were then placed in 3.5 inch Petri dishes and dusted as described above. Each treated leaf was then infested with 10 last instar squash bug nymphs and the covers of the Petri dishes were replaced. At the end of the 24 hours the treated leaves were removed and fresh untreated leaves were introduced into the dishes. Mortality counts were taken after the bugs had been on the untreated leaves for 24 hours.

wherein M is selected from the group consisting of ethyleneoxyethylene, tetramethylene and pentamethylene and $R^6$ is phenyl, said components being present in the ratio of about 2 parts of said carbamate ester to about one part of said dithiophosphate.

2. A method of killing insects which comprises applying to the insects and their habitat synergistic insecticidal compositions comprising O,O-dimethyl S-(1,2-dicarbethoxyethyl) dithiophosphate and an organic carbamate ester having the following general formula:

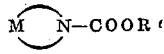

wherein M is selected from the group consisting of ethyleneoxyethylene, tetramethylene and pentamethylene and $R^6$ is phenyl, said components being present in the ratio of about 2 parts in said carbamate ester to about one part of said dithiophosphate.

*Table 1*

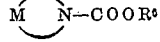

| Carbamates | | | Phosphate | | Rate (Lbs./A.) | Test Method | Test Subject | Mortality (Percent) |
| M | $R^6$ | Dust Conc. (Percent) | Name | Dust Conc. (Percent) | | | | |
| --- | --- | --- | --- | --- | --- | --- | --- | --- |
| Ethyleneoxyethylene | Phenyl | 0.5 | | | 12.4 | Dust Tower | Two-Spotted Spider Mite | 9 |
| | | | Malathion | 0.25 | 12.6 | do | do | 34 |
| Do | do | 0.5 | do | 0.25 | 10.2 | do | do | 100 |
| Do | do | 0.5 | | | 51.7 | do | Squash Bug | 0 |
| | | | Malathion | 0.25 | 46.6 | do | do | 10 |
| Do | do | 0.5 | do | 0.25 | 45.6 | do | do | 100 |
| Tetramethylene | do | 0.5 | | | 53.4 | do | do | 0 |
| | | | Malathion | 0.25 | 51.0 | do | do | 20 |
| Do | do | 0.5 | do | 0.25 | 50.4 | do | do | 70 |
| Do | do | 0.5 | do | | 5.0 | do | Two-Spotted Spider Mite | 6 |
| | | | do | 0.25 | 5.0 | do | do | 6 |
| Do | do | 0.5 | do | 0.25 | 5.0 | do | do | 99 |
| Pentamethylene | do | 0.5 | | | 31.1 | do | Squash Bug | 0 |
| | | | Malathion | 0.25 | 28.3 | do | do | 0 |
| Do | do | 0.5 | do | 0.25 | 29.7 | do | do | 90 |
| Do | do | 0.5 | | | 4.2 | do | Two-Spotted Spider Mite | 9 |
| | | | Malathion | 0.25 | 5.0 | do | do | 6 |
| Do | do | 0.5 | do | 0.25 | 5.2 | do | do | 100 |

The results of the data summarized in Table 1 demonstrate the marked synergism of the insecticidal compositions of this invention.

This application is a division of copending application Serial No. 496,596, filed March 24, 1955, now abandoned, which is a continuation-in-part of Serial No. 427,374, filed May 3, 1954, now abandoned.

We claim:

1. Synergistic insecticidal compositions comprising O,O-dimethyl S-(1,2-dicarbethoxyethyl) dithiophosphate, and an organic carbamate ester having the following general formula:

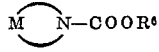

References Cited in the file of this patent

UNITED STATES PATENTS

| | | |
|---|---|---|
| 2,503,390 | Jelinek | Apr. 11, 1950 |
| 2,679,508 | Gysin | May 25, 1954 |

OTHER REFERENCES

King: U.S. Dept. Agr. Handbook No. 69, May 1954, pp. 105–108.

Chemical Age., vol. 63, No. 1631 (1950), p. 540.

Sharp: Agr. News Letter, Jan.–Feb. 1952, pp. 1–3.

Roark: U.S. Dept. Agr. Bull. E-344 (May 1935), pp. 2–6.

Frear: Chem. of the Pesticides, 3rd ed., January 1955, pp. 73–91.